United States Patent [19]
Korenshtein

[11] Patent Number: 5,680,621
[45] Date of Patent: Oct. 21, 1997

[54] SYSTEM AND METHOD FOR DOMAINED INCREMENTAL CHANGES STORAGE AND RETRIEVAL

[75] Inventor: Roni Korenshtein, Los Gatos, Calif.

[73] Assignee: International Business Machines Corporation, Armonk, N.Y.

[21] Appl. No.: 486,485

[22] Filed: Jun. 7, 1995

[51] Int. Cl.⁶ .................................................. G06F 9/44
[52] U.S. Cl. .................................................. 395/705
[58] Field of Search ........................... 395/500, 479, 395/700, 161, 578, 705, 376, 384

[56] References Cited

U.S. PATENT DOCUMENTS

| | | | |
|---|---|---|---|
| 4,181,954 | 1/1980 | Rosenthal et al. | 364/520 |
| 4,558,413 | 12/1985 | Schmidt et al. | 364/200 |
| 4,714,992 | 12/1987 | Gladney et al. | 364/200 |
| 4,809,170 | 2/1989 | Leblang et al. | 364/200 |
| 5,047,923 | 9/1991 | Elstner et al. | 364/200 |
| 5,182,806 | 1/1993 | McKeeman et al. | 395/700 |
| 5,193,185 | 3/1993 | Lanter | 395/600 |
| 5,220,657 | 6/1993 | Bly et al. | 395/479 |
| 5,255,389 | 10/1993 | Wang | 395/600 |
| 5,278,979 | 1/1994 | Foster et al. | 395/600 |
| 5,287,501 | 2/1994 | Lomet | 395/600 |
| 5,347,653 | 9/1994 | Flynn et al. | 395/600 |
| 5,363,483 | 11/1994 | Jones et al. | 395/161 |
| 5,381,545 | 1/1995 | Baker et al. | 395/575 |
| 5,404,525 | 4/1995 | Endicott et al. | 395/700 |
| 5,418,945 | 5/1995 | Carter et al. | 395/600 |
| 5,428,792 | 6/1995 | Conner et al. | 395/700 |
| 5,454,104 | 9/1995 | Steidmayer et al. | 395/600 |
| 5,473,772 | 12/1995 | Halliwell et al. | 395/650 |
| 5,491,821 | 2/1996 | Kilis | 395/700 |
| 5,519,866 | 5/1996 | Lawrence et al. | 395/700 |
| 5,530,855 | 6/1996 | Satoh et al. | 395/600 |

*Primary Examiner*—Kevin J. Teska
*Assistant Examiner*—Dan Fiul
*Attorney, Agent, or Firm*—Prentiss W. Johnson; Sterne, Kessler, Goldstein & Fox P.L.L.C.

[57] ABSTRACT

A computer or computer program product having a computer-readable medium comprising at least one controller to enable a processor to perform incremental changes storage and retrieval. The at least one controller comprises an incremental storage adaptor for enabling the processor to store a change associated with a base file, rather than modifying the base file by the change and storing the result as a new file. An incremental retrieval adaptor is included for enabling the processor to merge the change with the base file thereby forming a logical new file. The incremental retrieval adaptor can perform the merging in response to a call from an application running on the processor or another processor, and the incremental retrieval adaptor then provides or otherwise makes the logical new file available to the application.

15 Claims, 3 Drawing Sheets

SYSTEM AND METHOD FOR DOMAINED INCREMENTAL CHANGES STORAGE AND RETRIEVAL

CROSS-REFERENCE TO RELATED APPLICATION

The following is a related, commonly owned, co-pending application:

Computer Program Product for Domained Incremental Changes Storage and Retrieval, U.S. patent application Ser. No. 08/486,028.

DESCRIPTION

1. Technical Field

The present invention relates to the field of data processing, and more particularly, to a system and method for making a multi-step processing pattern more efficient.

2. Background Art

Various code generation tools read a file (text or binary), and based on the contents of the file, they generate a new file. In many cases the new file is mostly the original file, with some changes. This new file is then used by another software processor, such as a compiler. This process is not very efficient for the following reasons: (1) the code generation tool has to read the original file and write the new file, and (2) several passes through file are sometimes required during the generation, each time adding more information to the generated file, and each time, the whole (new) file is written to secondary memory, such as a disk memory.

Consider the pattern of the following scenario shown in FIG. 1. A user creates and stores a data file 102 called ORIGINAL. An application 104, or some type of a code generator utility, called CODEGEN, reads ORIGINAL, processes it, then writes a new file 106, called GENERATED. GENERATED is used by another utility 108, called COMPILER. Many pre-processors operate in this manner.

More specifically, consider a tool, called CODEGEN, that reads a C++ file, ORIGINAL, and generates a new file, GENERATED, in which every class defined in ORIGINAL is changed to inherit from some base class. For example, if the ORIGINAL file contains the following at line 98:

class A
{...};

The generated file will contain:

class A : public Base
{...};

In other words, the information ": public Base" is inserted into line 98 by the code generation tool, CODEGEN.

This process requires that the entire file be both read from, and written to secondary memory every time a file is (re)generated. The reading of the original file and the writing of the generated file is a drain on system resources, and requires a great deal of input/output (I/O) bandwidth. What is desired is a technique for making incremental changes to files that minimizes use of a system's I/0 resources, improve response time and usability.

DISCLOSURE OF INVENTION

The present invention is directed to a system and method or computer program product for storing and accessing data via a controller having adapters so that the overall process takes less time. The time saved is due to the reduced amount of I/O time.

This technique saves time by eliminating the need to write new generated files to disk. Rather than doing that, just the changes are written and maintained in association with the original (base) file. An entire new file is not written to disk. Two adapters are described. One creates and maintains the changes, and the other adaptor is used to access a "logical new file," which is the base file modified by the changes.

The controller comprises an incremental storage adaptor for enabling a computer to store a change associated with a base file, rather than modifying the base file by the change and storing the result as a new file, and an incremental retrieval adaptor for enabling the processor to merge the change with the base file thereby forming a logical new file. The incremental retrieval adaptor performs the merging in response to a call from an application running on a processor, and the incremental retrieval adaptor then provides or otherwise makes the logical new file available to the application.

In a preferred embodiment of the invention, the changes are stored in a domained incremental change repository. Calls to the ISA and IRA to do I/O pass information identifying the domained incremental change repository and the base file. The incremental storage adaptor interfaces with the domained incremental change repository to store changes. The incremental retrieval adaptor interfaces with the domained incremental change repository in a process to retrieve records from the logical new file. (These records are retrieved from either the base file or from a domain incremental changes repository.)

In a further embodiment the system has a plurality of domained incremental change repositories, and each base file can have changes in one or more domained incremental change repositories.

The foregoing and other features and advantages of the invention will be apparent from the following more particular description of preferred embodiments of the invention, as illustrated in the accompanying drawings.

BRIEF DESCRIPTION OF DRAWINGS

The invention will be better understood if reference is made to the accompanying drawings.

In the drawings, like reference numbers indicate identical or functionally similar elements. Additionally, the left-most digit of the reference number identifies the drawing in which the reference number first appears.

BEST MODE FOR CARRYING OUT THE INVENTION

1. Nomenclature and Definitions

Figure 1:
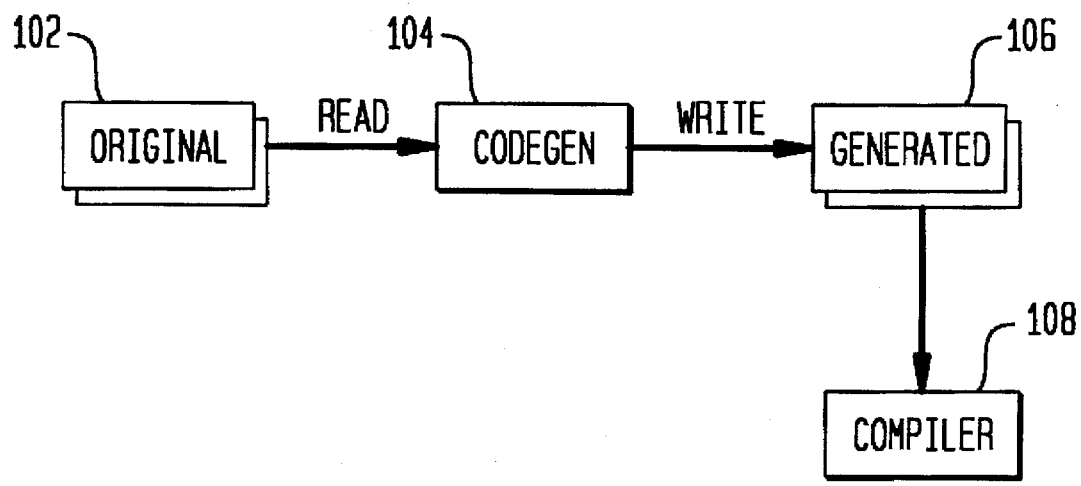
FIG. 1 shows a representative example of a conventional multi-step processing pattern.

The detailed descriptions which follow are presented in part in terms of algorithms and symbolic representations of operations on data bits within a computer memory representing alphanumeric characters or other information. These descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, symbols, characters, display data, terms, numbers, or the like. It should be borne in mind, however, that all of these and similar terms are to be associated with the appropriate physical quantities and are merely used here as convenient labels applied to these quantities.

Further, the manipulations performed are often referred to in terms, such as comparing or adding, commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases the distinction between the method operations in operating a computer and the method of computation itself should be recognized. The present invention relates to method steps and apparatus for operating a computer in processing electrical signals to generate other desired physical signals.

The present invention also relates to an apparatus for performing these operations. This apparatus may be specifically constructed for the required purposes or it may comprise a general purpose computer as selectively activated or reconfigured by a computer program stored in the computer. The algorithms presented herein are not inherently related to any particular computer or other apparatus. In particular, various general purpose machines may be used with programs written in accordance with the teachings herein, or it may prove more convenient to construct more specialized apparatus to perform the required method steps. The structure for a variety of these machines will become apparent from the description below.

In the following description, several terms are used frequently, have specialized meanings in the present context, and are thus defined. The terms "application," "application program," and "program" are used interchangeably herein to refer to any computer program run in conjunction with the present inventive system and method. The terms "disk," "disk drive," and "secondary memory" are used interchangeably to refer permanent-type memory storage requiring I/O operations, rather that main memory that is used by a processor for running programs, and the like. The terms "ORIGINAL" file and "base" file are used interchangeably. CODEGEN and COMPILER are terms used to represent application programs.

2. Overview of the Invention

The present invention includes an incremental Storage Adapter, (ISA; described below), to store changes in some association with a base file. The present invention also includes an incremental retrieval Adapter, (IRA; described below) to retrieve records to form a "logical new file" by merging the base file with stored changes. Thus, rather than generating and saving a new file, the changes are machine readable records stored separately, but in association with the base file that are combined to form the logical new file in a manner transparent to an application that uses the new logical file.

Referring again to the above example, according to the present invention the string "R 98 class A: public Base" can be stored as a change, where "R 98" identifies that new line 98 needs to be replaced, and the string that follows (i.e., "class A: public Base") is the new contents of line 98. Change information can contain information for replacing, inserting and deleting lines, bytes, records, and the like.

Some pre-processors (CODEGENs) have to generate and regenerate code several times before the next process is invoked, because as more files are processed, new information needs to be added to files that have already been generated.

In order to compare the efficiency of the present invention to conventional techniques, consider the following analysis, where:

P=number of times CODEGEN needs to regenerate a file.

D=cost of reading the entire file =cost of writing the entire file (Assuming read time cost the same as write time)

Then doing the CODEGEN process in the conventional way would cost up to:

$$Cost1=2*D*P$$

That is because every time a regeneration is performed, the entire base file must be read from disk, and the GENERATED file must be written to disk.

Taking advantage of the present invention, the process can take as little as:

$$Cost2=1*D$$

Because only the base file needs to be read, no substantive writing is done (assuming the writing of the change takes relatively no time with respect to D, which is the reading or writing time of the entire file).

So the present invention is cheaper than the old method by:

$$Cost1-Cost2=2*D*P-D=D*(2P-1)$$

For example, if it takes 10 seconds to read/write a file (D=10 seconds), and only one iteration of code generation is necessary (P=1), doing it the conventional way, CODEGEN would spend 2 * 10=20 seconds. Using the new method according to the present invention, it would only take 10 seconds. If, however, three iterations of code generation are required (P=3) by the conventional way, the cost would be 60 seconds, where doing it according to the invention would still take only 10 seconds.

The calculations for these comparative examples are approximations assuming that changes are small, and GENERATED is about the same size as the base file. Also, it is assumed that the time it takes to write the change is negligible. The larger the file, the more negligible this time is.

The present invention comprises two major adapters, an Incremental Storage Adapter (ISA) and an Incremental Retrieval Adapter (IRA). Preferably, the ISA and IRA are implemented as processing elements (e.g., controller logic) operating in accordance with software being executed on a processing element of a computer system. A preferred embodiments of the ISA and IRA are described in detail below in the form of pseudo code. The ISA is responsible for storage of changes in an associated domain and the IRA is responsible for merging a base and the changes from an associated domain to form a logical new file. Both controllers can be parts of the same physical adapter.

3. Incremental Storage Adapter (ISA)

Figure 2:
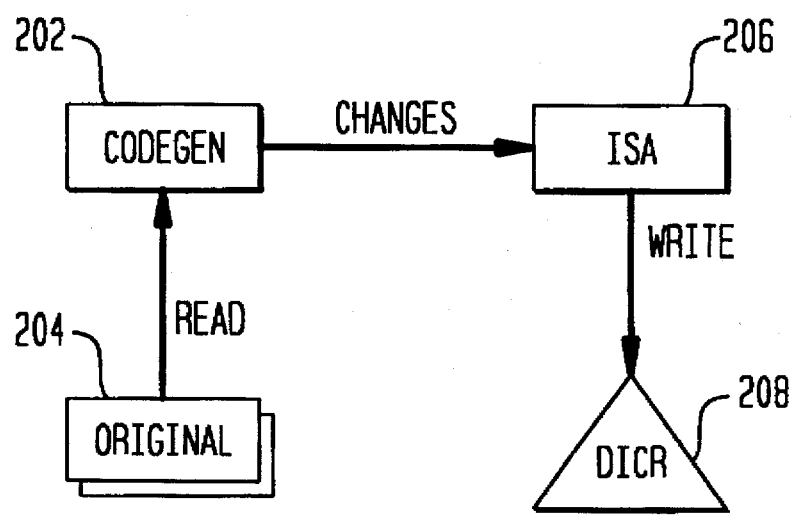
FIG. 2 shows a diagram including an incremental storage adaptor (ISA), in accordance with the present invention.

This controller is used to maintain the change information associated with a given base file. FIG. 2 shows a flow diagram for ISA operation. CODEGEN 202 reads base file ORIGINAL 204. changes are passed to an ISA 206 that writes the changes to a repository 208, called a domain incremental changes repository (DICR), which is described further below. The ISA maintains this information in an efficient manner for the Operating System (OS; not shown) in which it runs. Every update to the base file is made through the ISA.

4. Incremental Retrieval Adapter (IRA)

Figure 3:
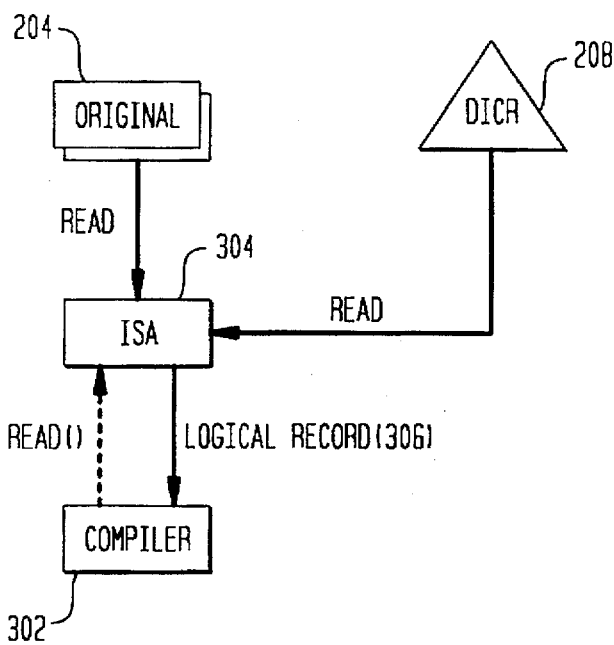
FIG. 3 shows a diagram including an incremental retrieval adaptor (IRA), in accordance with the present invention.

FIG. 3 shows a flow diagram for an IRA operation. An application/process (e.g., COMPILER 302) that requires reading a file makes a function call, or otherwise interfaces with an IRA 304 to read (see Read(record name)) a record. The IRA 304 reads or otherwise accesses the base file ORIGINAL 204, as well as any associated changes from the DICR 208. The IRA combines the base file with the changes read form the DICR 208 to create a logical record 306, and forwards the logical record 306 to the COMPILER 302.

Some applications can interface with both the ISA and the IRA, and thus act as both a the CODEGEN and the COMPILER applications in the above examples. Consider a file editor for example. When an edited file is relatively large, and the changes the user makes in any editing session are relatively small, the editor can be analogized to a CODEGEN application, where the input file is the base file, and through editing, a logical new file is created by storing changes in accordance with the present invention.

The ISA, on OS/2™ for example, may store the change information as an attribute of the extended attributes of the base file, or the extended attribute may contain the name of the file that contains the changes. On systems that do not have extended attributes, the extended attributes may be emulated by other means available on that system, or by an associated file.

5. The "Domained" Concept

A single base file can be run through two different code generators. Each produces a new file that is very similar to the old file, but each produces a different new file. This example illustrates the fact that more than one set of changes may be needed. Each code generator produces changes that are applicable to its domain. A domain therefore is a named repository of changes, which when applied to the base file, produces the target file. Several different CODEGENs can make use of the present invention, each having its own domain name. Additionally, a single base file can have more that one domain associated with it.

6. Data and Logic 6.1 Data

The following data is needed per file, in addition to standard operating system (OS) information that is maintained for each file such as its file name, contents, and the like, as would be apparent to a person skilled in the relevant art.

6.1.1 Domained incremental Change Repository (DICR)

A DICR is a named collection of changes that need to be applied to an associated base file or set of files for processing of logical new file(s). (This representation needs to be stored in association with the base file(s) as described above, i.e., extended attributes or an equivalent linking technique, as would become apparent to a person skilled in the data processing art.)

6.2 Logic

An object of the domained incremental changes storage invention is to open the door for innovations in the storage and processing of the changes. Therefore, the ISA and IRA are described in a very high level logic. There are many ways to actually implement the present system and method, as would be apparent to a person skilled in the relevant art.

6.2.1 ISA Logic

It is possible to have the ISA provide only one interface function, namely update, such that whenever an application calls this function, the ISA appends the change information to the DICR whose name is passed as the domain name. Exemplary logic for this shown in Table 1.

TABLE 1

Update( fileID, domainName, changeInfo)
{
    obtain the current value of the DICR whose name is
        contained in the argument domainName, for the
        file identified by the value of argument
        fileID and put it in variable TEMP. (TEMP
        contains the set of all changes in the
        specified domain for the specified file.)
    add the new change (whose information is in
        changeInfo) to TEMP. (This may involve
        more complex processing in order to
        optimize the performance of the IRA, the
        ISA may store the changes in a more
        efficient organization than a simple
        sequential order, e.g., sorted order.)
    write the value of TEMP as the new value of the
        DICR whose name is contained in
        domainName, for the file identified by the
        value of fileID.
}

The above update function can be broken into 3 separate functions: open, update and close, in which case the open function is called to identify the base file and the domain, followed by a series of calls to the update function, followed by a call to the close function. This can be used in a CODEGEN application where, due to the nature of the CODEGEN application, the changes need to be communicated to the ISA over time and not all at once. In this case, when the open function is called, which specifies the file name and the domain name, the ISA reads the value of the domain, (i.e., the list of changes so far). With each update function call, the list is modified with the new changes added, and when the close function is called the new DICR representing the domain is written to disk.

6.2.2 IRA Logic

The IRA interface can be as extensive as any OS's file input interface. For simplicity, and for the sake of demonstrating the concept, the logic below in Tables 2–4 describes a sequential read of a line of text, and assumes the change information maintained by the ISA is on a line basis, although it could be based on byte/character, record, or any unit.

Table 2 represents an algorithm for the opening of a file (whose name passed in the field "fileID") and obtaining the set of changes in the domain (whose name is passed in the field "domainName") associated with the specified file.

TABLE 2 open( fileID, domainName)
{
    obtain the current value of the DICR whose name is
        contained in the argument domainName, for the
        file identified by the value of fileID.
    open the file identified by the value of the
        argument FileID. (File pointer is pointing to
        the first line in the file.)
}

Table 3 represents an algorithm to read the next line. This algorithm returns to the next logical line based on the base file and the information in the DICR. The DICR could be passed as a parameter to the function, it could be a global parameter, or it could be obtained based on the FileID.

TABLE 3

```
readLine( fileID)
{
    Determine whether the current line has been
        replaced and the new contents are in the
        domain, or a new line has been inserted at
        this point and the new line is in the domain,
        or the current line has been deleted and that
        information is in the domain (this information
        is in the DICR).
    if replaced /* replacement is in the domain */
        {
        read a line from the base file, advancing the
            file pointer to skip over this line.
        read and return the line from the domain pool.
        }
    else if inserted /* a new line has been inserted at
        this point */
        {
        read and return the line from the domain pool
        }
    else if deleted
        {
        read a line from the base file, advancing the
            file pointer to skip over this line.
        return readLine( fileID)
        }
    else
        read a line from the base file and return it.
}
```

Table 4 is simple the closing of the IRS operation.

TABLE 4

```
close ( fileID)
{
    close the file and the DICR.
}
```

7. DICR Clean-up

When updating the DICR, the ISA can have a rule that is triggered when the number of changes, or the type and contents of the changes exceed or meet some criteria. As a result of this condition, the ISA can "clean up" the repository by "rolling in" (e.g., merging the base file with changes) into a whole new base file and deleting, or emptying the domain.

8. Other uses/examples/applications

The present invention is applicable to many applications in addition to the code generation utilities, and editors that were mentioned above. Compilers, linkers and multimedia tools may also use it to improve performance or to save storage space.

8.1 Plural Domain Example

Figure 4:
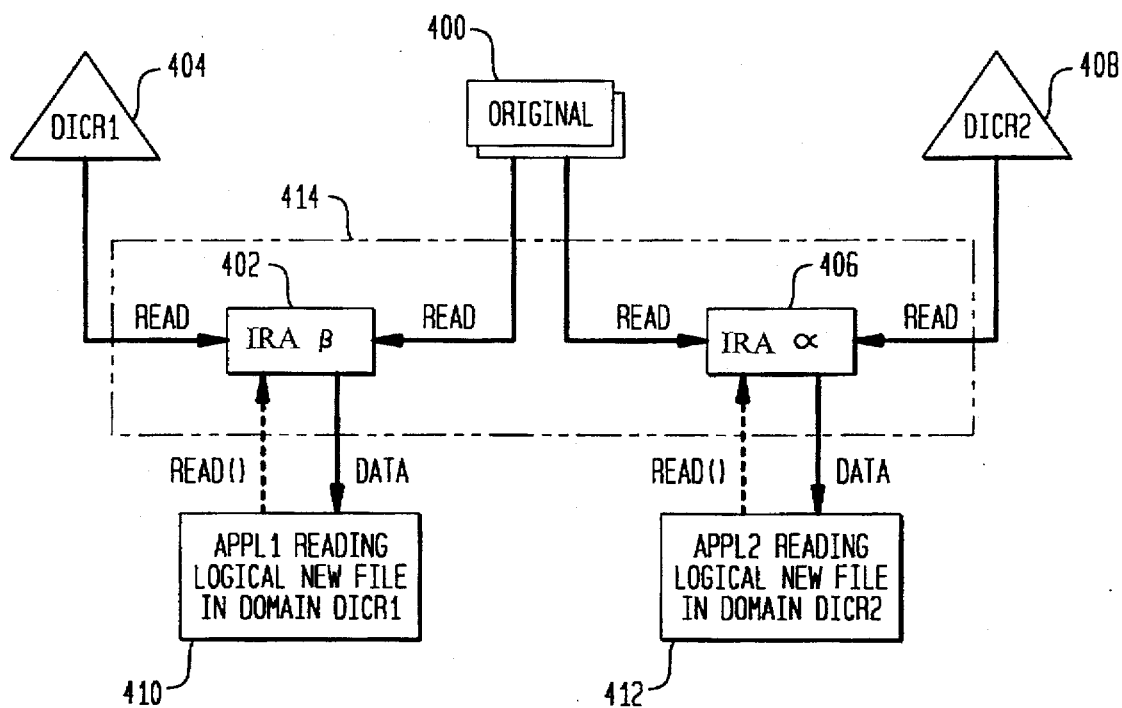
FIG. 4 shows a flow diagram for plural IRAs, in accordance with another embodiment of the present invention.

FIG. 4 shows flow diagram for plural IRAs that make changes to a single ORIGINAL base file 400 in two different domains. A first IRA α 402 applies changes of a first domain DICR1 404. A second IRA β 406 applies changes of a second domain DICR2 408. In this example, a first application (APPL1) 410 goes through IRA α 402 to read ORIGINAL 400, specifying domain DICR1 404. IRA α 402 reads the ORIGINAL 400 and the changes from DICR1 404, combines them into a new record in this domain, and returns it as data to APPL1 410. Similarity, a second application (APPL2) 412 goes through IRA β 406 to read ORIGINAL 400, specifying domain DICR2, and the changes from DICR2 408, combines them into a new record in the second domain, and returns it as data to APPL2 412.

IRA α and IRA β are both instances of the same IRA code. They are represented as separate boxes because in this example each retrieves data from a different domain.

8.2 Still and Moving Pictures

Touch-ups, performed with a utility such as PHOTOSHOP™, can be implemented in a more efficient manner in accordance with the present invention. Rather than saving a whole new file, it can be more beneficial to only save touch-ups as changes and keep the original picture as a base file as described above.

The present invention is also applicable to digital motion pictures (i.e., video). A digital video can be edited to change a few frames. Rather than saving a whole new video, just the changed frames can be saved as changes, or perhaps just the changes to the specific frames.

8.3 Incremental Compiler Example

An incremental compiler can take advantage of a DICR system in the following way. A compilation of some file produces an object (.OBJ) file. Later on, the user may change a single function in the module. That function is incrementally compiled, and rather than writing a whole new .OBJ file, only the change is written to disk. In other words, the change identifies the fact that bytes x-y (old compiled function) need to be replaced with the certain new bytes (the new compiled function). When the linker is invoked with the appropriate invocation option, it knows to go through the IRA, which merges the base .OBJ file and the incremental compiled changes. In a similar way, the incremental linker can also use the ISA to just write updates to the already existent executable file (.EXE). When the loader is invoked, it can access the domain containing the changes to the .EXE through the IRA and load the new .EXE.

9. Hardware Exemplar

Figure 5:
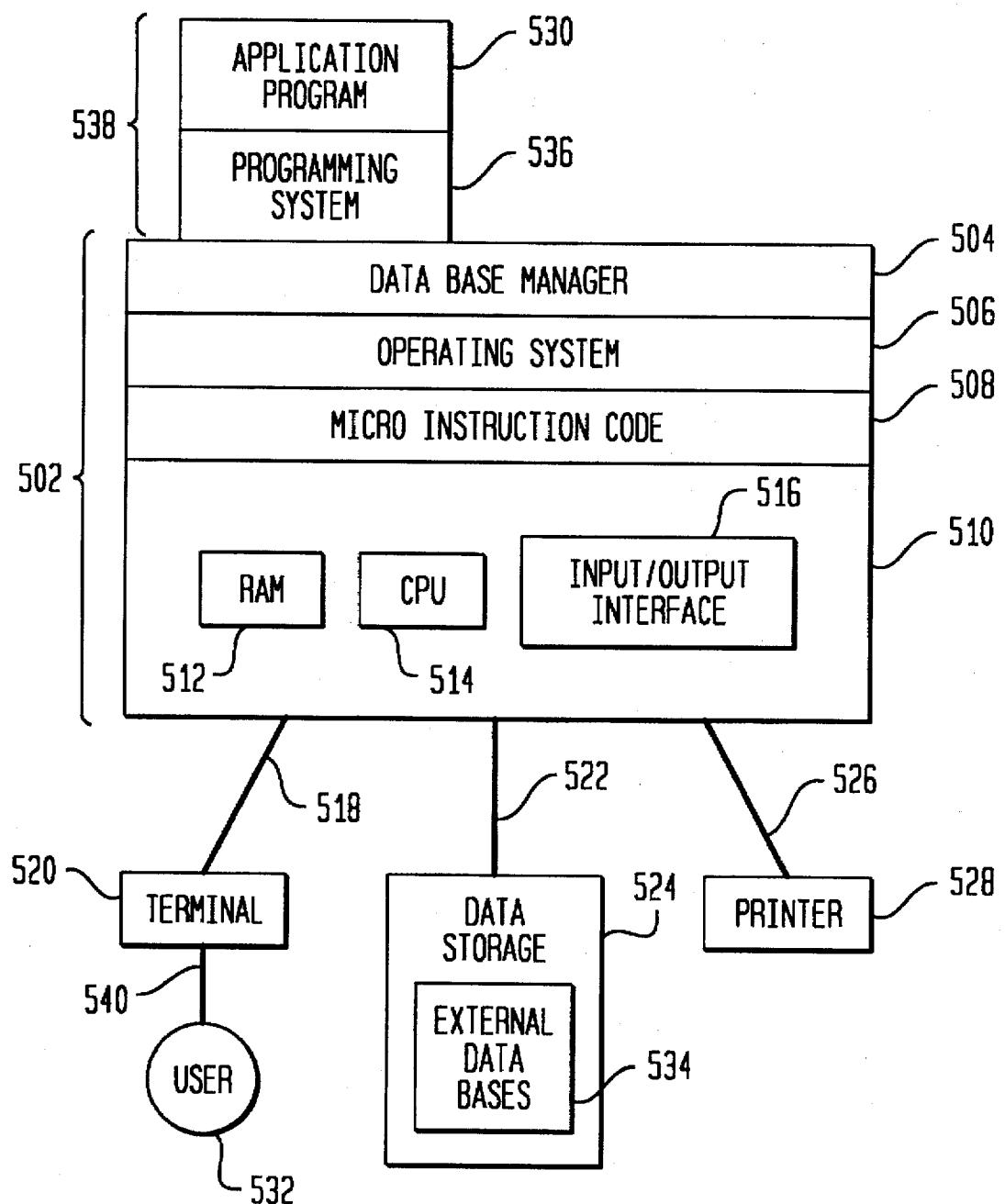
FIG. 5 shows an example of a computer system environment depicting a hardware implementation of the present invention.

An example of a computer system environment depicting a hardware implementation of the present is shown in FIG. 5. The computer system environment comprises a computer controller 538, which operates on a computer platform 502. The computer controller 538 includes one or more application program(s) 530 and an programming system 536, for example. The computer platform 502 includes hardware units 510 including a central processing unit (CPU) 514, a random access memory (RAM) 512, and an input/output interface 516. The RAM 512 is also called a main memory 512. The computer platform 502 also includes microinstruction code 508, an operating system 506, and a database manager 504. Various peripheral components may be connected to the computer platform 502, such as a terminal 520, a data storage device 524, and a printing device 528. The data storage device or secondary storage 524 may include hard disks and tape drives. The data storage device 524 represents non-volatile storage. External databases 534 are stored on the secondary storage 524. The operating system uses virtual memory and manages all memory paging. Users 532 interact with the computer platform 502 and the computer controller 538 via terminal 520.

The ISA and IRA of the invention can be implemented by an application program 530 or the programming system 536, as would become apparent to a person skilled in the art and versed in the computer programming language C, C++, or the like. In an example embodiment, the DICR can be stored in an external database 534. In summary, the invention is platform and language independent.

10. Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents. All cited patent documents and publications in the above description are incorporated herein by reference.

Having thus described our invention, what we claim as new and desire to secure by Letters Patent is:

1. A computer system for incremental changes storage and retrieval, comprising:

a processor;

at least one controller to control said processor, comprising:

incremental storage adaptor means for enabling said processor to store a change associated with a base file, rather than modifying the base file by said change and storing the result as a new file; and incremental retrieval adaptor means for enabling said processor to merge said change with said base file thereby forming a logical new file;

wherein said incremental retrieval adaptor performs said merging in response to a call from an application running on said processor, and said incremental retrieval adaptor then provides or otherwise makes said logical new file available to said application.

2. The system according to claim 1, wherein said change is stored in a domained incremental change repository.

3. The system according to claim 2, wherein said call passes information identifying said domained incremental change repository and said base file to said incremental retrieval adaptor.

4. The system according to claim 2, wherein said system has a plurality of domained incremental change repositories.

5. The system according to claim 2, wherein said incremental storage adaptor means interfaces with said domained incremental change repository to one of add, delete and roll-back changes therein.

6. The system according to claim 2, wherein said incremental retrieval adaptor means interfaces with said domained incremental change repository in a process to form a logical new file.

7. The system according to claim 2, wherein said base file has changes in two or more domained incremental change repositories.

8. The system according to claim 2, wherein said base file has a default domained incremental change repository.

9. A controller for enabling a processor to perform incremental changes storage and retrieval, comprising:

incremental storage adaptor means for enabling the processor to store a change associated with a base file, rather than modifying the base file by said change and storing the result as a new file; and incremental retrieval adaptor means for enabling the processor to merge said change with said base file thereby forming a logical new file;

wherein said incremental retrieval adaptor performs said merging in response to a call from an application running on said processor, and said incremental retrieval adaptor then provides or otherwise makes said logical new file available to said application.

10. The controller according to claim 9, wherein said change is stored in a domained incremental change repository.

11. The controller according to claim 10, wherein said system has a plurality of domained incremental change repositories.

12. The controller according to claim 10, wherein said incremental storage adaptor means interfaces with said domained incremental change repository to one of add, delete and roll-back changes therein.

13. The controller according to claim 10, wherein said incremental retrieval adaptor means interfaces with said domained incremental change repository in a process to form a logical new file.

14. The controller according to claim 10, wherein said base file has changes in two or more domained incremental change repositories.

15. The controller according to claim 10, wherein said base file has a default domained incremental change repository.

* * * * *